(12) United States Patent
Matsuno et al.

(10) Patent No.: US 6,708,088 B2
(45) Date of Patent: Mar. 16, 2004

(54) VEHICLE BEHAVIOR CONTROL APPARATUS

(75) Inventors: Koji Matsuno, Tokyo (JP); Katsufumi Ichikawa, Tokyo (JP); Masaru Kogure, Tokyo (JP); Yutaka Hiwatashi, Tokyo (JP); Takayuki Ushijima, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/132,017

(22) Filed: Apr. 22, 2002

(65) Prior Publication Data

US 2002/0153770 A1 Oct. 24, 2002

(30) Foreign Application Priority Data

Apr. 24, 2001 (JP) .................. P.2001-126240

(51) Int. Cl.[7] .................. G06F 7/00
(52) U.S. Cl. .................. 701/1; 701/41; 701/42; 701/74
(58) Field of Search .................. 701/1, 36, 37, 701/38, 41, 51, 70–74, 78–80

(56) References Cited

U.S. PATENT DOCUMENTS

| | | | |
|---|---|---|---|
| 5,333,058 A | 7/1994 | Shiraishi et al. | 364/424.05 |
| 5,671,143 A | 9/1997 | Graber | 364/426.016 |
| 5,700,073 A | 12/1997 | Hiwatashi et al. | 303/146 |
| 5,742,917 A | 4/1998 | Matsuno | 701/69 |
| 5,869,753 A | 2/1999 | Asanuma et al. | 73/117.3 |
| 6,161,905 A | 12/2000 | Hac et al. | 303/146 |

FOREIGN PATENT DOCUMENTS

| | | | | |
|---|---|---|---|---|
| DE | 19856792 | 6/1999 | | B60T/7/12 |
| EP | 0943514 | 9/1999 | | B60T/8/24 |
| JP | 05278489 | 10/1993 | | B60K/17/348 |
| JP | 06072169 | 3/1994 | | B60K/17/348 |

*Primary Examiner*—Richard M. Camby
(74) *Attorney, Agent, or Firm*—Darby & Darby

(57) ABSTRACT

A vehicle behavior control apparatus is divided into three major parts, sensors for detecting engine and vehicle operating conditions, a target yaw rate establishing section for establishing the rate and differential limiting apparatuses for selectively varying distribution ratios of driving force between front and rear wheels and/or between left and right wheels. The target yaw rate establishing section calculates a target yaw rate based on a vehicle mass, a mass distribution ratio between front and rear axles, front and rear axle mass, distances between front and rear axles and a center of gravity, a steering angle of a front wheel, and front and rear wheels equivalent cornering powers. A steady state yaw rate gain is separately calculated for left and right steering, respectively. A reference yaw rate is calculated by correcting a time constant of lag of yaw rate with respect to steering based on estimated road friction coefficient.

28 Claims, 10 Drawing Sheets

VEHICLE BEHAVIOR CONTROL APPARATUS

BACKGROUND OF THE INVENTION

The present invention relates to a vehicle behavior control apparatus capable of calculating accurate target yaw rates used for various vehicle behavior control means.

In recent years, various vehicle behavior control means such as a limited differential control, a driving force distribution control and the like have been applied to actual vehicles in market. In a vehicle behavior control means, control variables are calculated based on target yaw rates established according to vehicle motion conditions.

Generally, in vehicle behavior controls, if the same target yaw rate as that on a road surface with high friction coefficient is established when a vehicle travels on a road surface with low friction coefficient, a target yaw rate is established to a yaw rate exceeding the limit of yaw rate under which a vehicle can travel safely on a road surface with low friction coefficient and as a result the yaw rate conversely strengthens a tendency of spin of the vehicle.

For example, in case of a front and rear wheels driving force distribution control of a four wheel drive vehicle, when a yaw rate actually detected (actual yaw rate) is smaller than a target yaw rate, it is necessary to correct a driving force distribution of rear wheels in an increasing direction in order to enhance a turning ability. Therefore, in case where the same target yaw rate as that on a road surface with high friction coefficient has been established during traveling on a road surface with low friction coefficient, the front and rear wheel driving force distribution control tries to realize a target yaw rate exceeding a yaw rate under which a vehicle can travels in a stable manner. As a result, the driving force of rear wheels increases excessively, this leading to a spoilage of the traveling stability of the vehicle.

In addition to this, since the yaw response speed versus to steering also goes down on a road surface with low friction coefficient (hereinafter, referred to as "low friction coefficient road"), when the steering wheel is cut back or in other case, the discrepancy between an actual yaw rate and a target yaw rate further increases and as a result the tendency of spin glows stronger.

To solve this problem, Japanese Patent Application Laid-open No. Toku-Kai-Hei 5-278489 discloses a technique in which the target yaw rate is corrected in a smaller direction, as detecting values of friction coefficients of road surfaces decrease.

On the other hand, in case where the accuracy in establishing the target yaw rate is low, since control gains or control sensitivities based on the deviation of actual yaw rates from target yaw rates must be restricted from the view point of preventing wrong way operations, it becomes difficult to fulfill adequate disturbance stability. As the causes of lowering the accuracy in establishing the target yaw rate, changes of road friction coefficients, an effect of responsibility when the steering wheel is rapidly operated, asymmetric property of the vehicle, nonlinearity when the steering wheel makes a large turn, changes of laden conditions and the like, are considered.

Hence, Japanese Patent Application Laid-open No. Toku-Kai-Hei 6-72169 discloses a technology in which a dynamic characteristic of the vehicle with respect to steering operation is enhanced by establishing a steering responsibility of the vehicle, specifically, a first order lag time constant of yaw response of the vehicle with respect to steering operation according to vehicle speeds.

However, the former prior art, Toku-Kai-Hei 5-278489, has a problem with responsibility and accuracy when a friction coefficient on road surface (hereinafter referred to as a road friction coefficient) is detected. Further, the prior art has a restriction in detectable vehicle traveling conditions and also a problem of difficulty in optimization of target yaw rates. Further, the latter prior art, Toku-Kai-Hei 6-72169, has an inadquate optimization of target yaw rate because the steering responsibility of the vehicle varies according to not only the vehicle speed but also the steering velocity.

SUMMARY OF THE INVENTION

It is an object of the present invention to provide a vehicle behavior control apparatus capable of accurately optimizing and establishing target yaw rates under various conditions including ones being suffered from various disturbances.

To attain the object, the vehicle behavior control apparatus a target yaw rate establishing means of the vehicle behavior control apparatus comprises a vehicle mass estimating means for estimating a vehicle mass based on a vehicle acceleration or deceleration, a mass distribution calculating means for calculating a mass distribution between front and rear axles based on the vehicle mass, a front and rear axles to gravity center distance calculating means for calculating distances between front and rear axles and a center of gravity, a front wheel steering angle calculating means for calculating a steering angle of a front wheel based on a steering wheel rotation angle, a stability factor calculating means for calculating a stability factor based on the vehicle mass, the vehicle mass distribution, the distances between front and rear axles and center of gravity and the steering angle of the front wheel and a target yaw rate calculating means for calculating the target yaw rate based on the stability factor.

Further, the front wheel steering angle calculating means includes a steering gear ratio varying means capable of varying a steering gear ratio according to a steering wheel rotation angle. The target yaw rate establishing means calculates the target yaw rate based on a steering gear ratio established by the steering gear ratio varying means.

Further, the target yaw rate establishing means includes a road friction coefficient estimating means for estimating a road friction coefficient. The target yaw rate establishing means calculates the target yaw rate by estimating a lag of target yaw rate with respect to steering according to the estimated road friction coefficient.

Further, the target yaw rate establishing means includes a warning means for warning the road friction coefficient and calculates the target yaw rate by estimating a lag of target yaw rate with respect to steering according to the estimated road friction coefficient and warns the estimated road friction coefficient by the warning means.

Further, the target yaw rate establishing means has a reference yaw rate calculating means for calculating a reference yaw rate which is a target yaw rate calculated by estimating a lag of yaw rate with respect to steering and the reference yaw rate is corrected by the reference yaw rate multiplied by a target yaw rate correction factor to obtain a final target yaw rate.

Further, the target yaw rate establishing means includes a road friction coefficient estimating means for estimating a road friction coefficient and calculates the target yaw rate by estimating a lag of target yaw rate with respect to steering according to the estimated road friction coefficient.

DESCRIPTION OF THE PREFERRED EMBODIMENT

Figure 1:
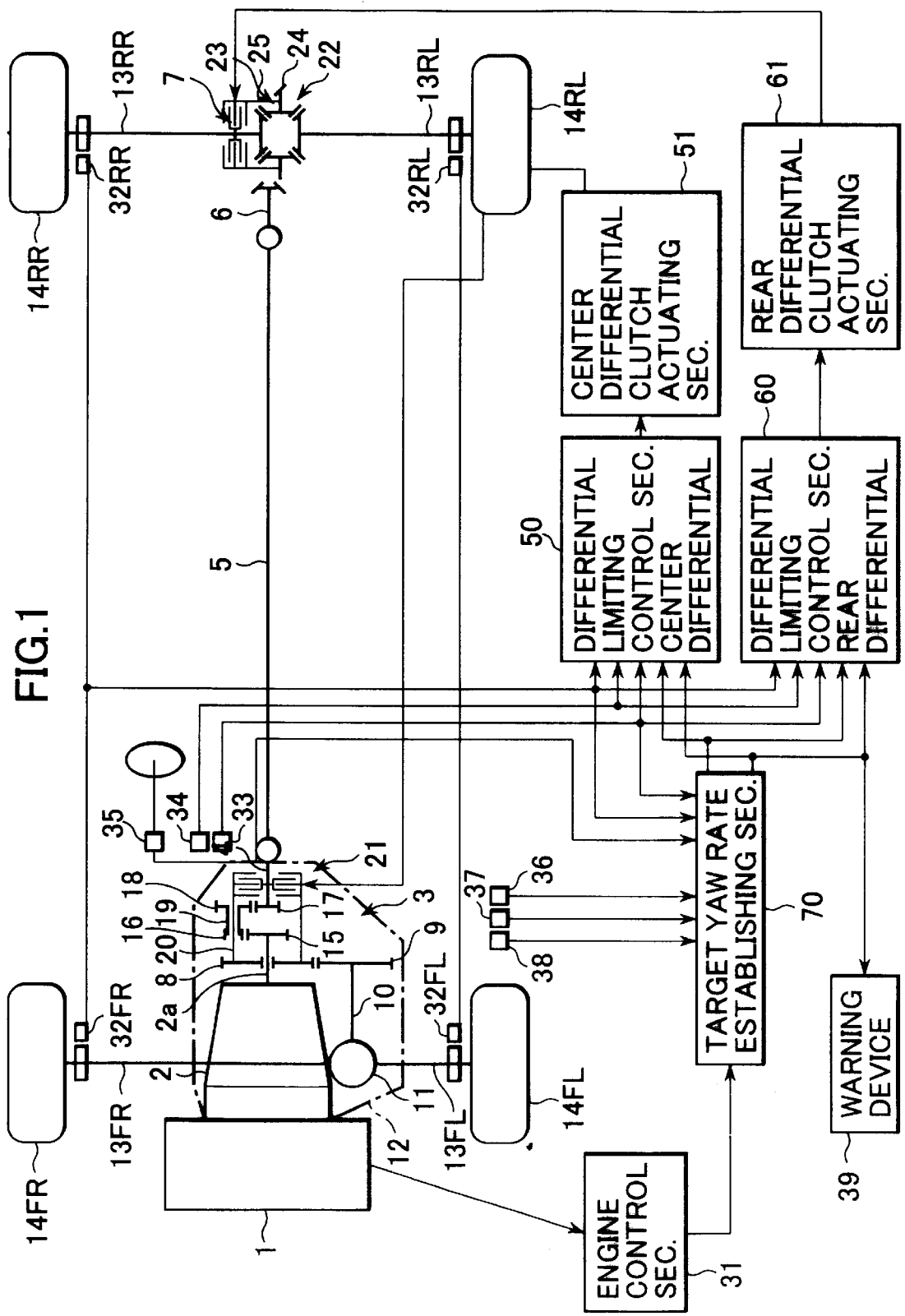
FIG. 1 is a schematic representation of a vehicle having a vehicle behavior control apparatus according to a first embodiment of the present invention.
Figure 2:
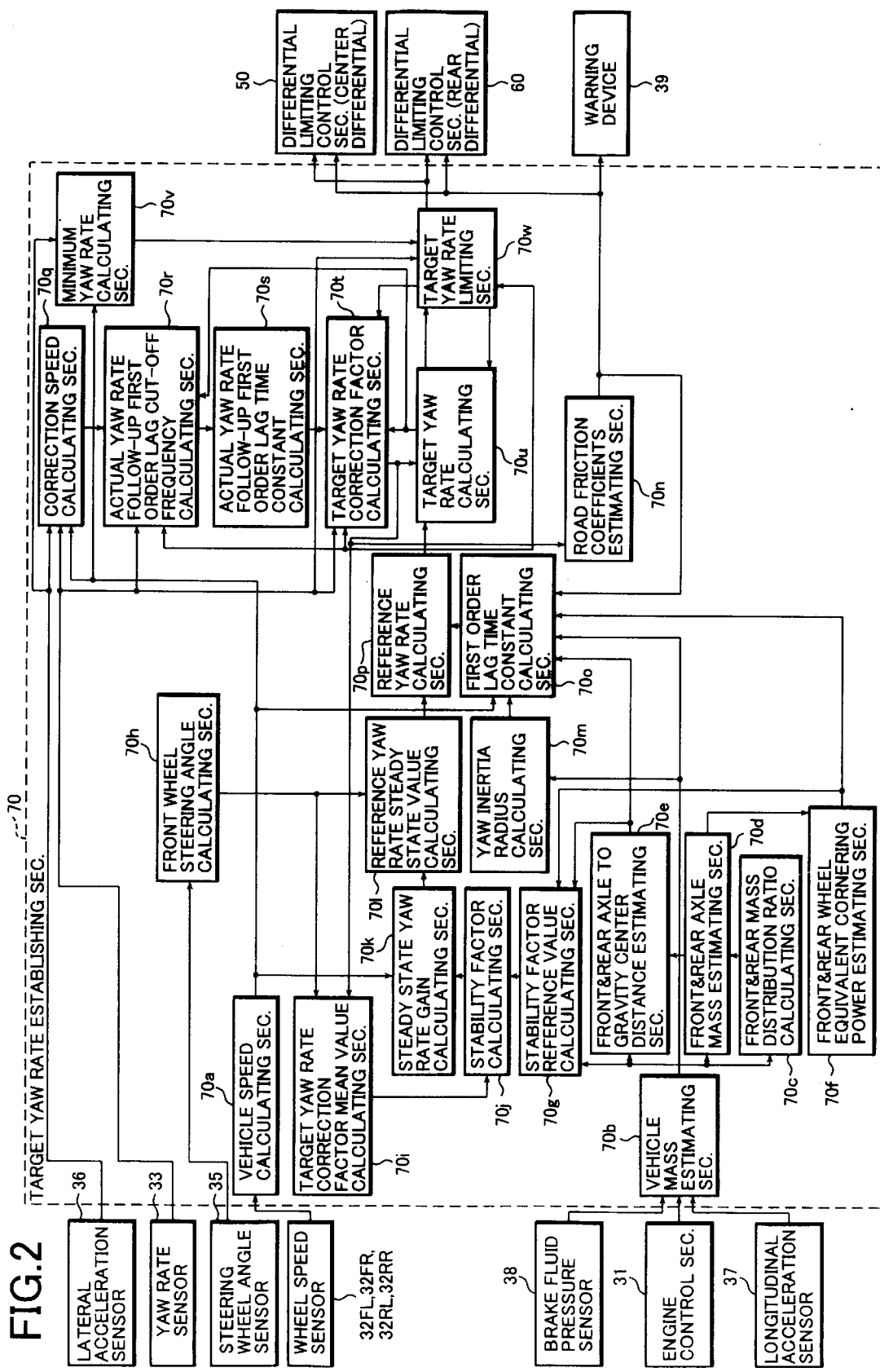
FIG. 2 is a functional block diagram of a target yaw rate establishing section of a vehicle behavior control apparatus according to a first embodiment of the present invention.

Referring to FIG. 1, the vehicle exemplified according to the first embodiment is a four wheel drive vehicle having a compound planetary gear type center differential and an automatic transmission. In the drawing, reference numeral 1 denotes an engine arranged at the front part of the vehicle. Driving force of the engine 1 is transmitted to a center differential 3 through an automatic transmission 2 disposed behind the engine 1 and a transmission output shaft 2a. Driving force on the rear wheel side inputs to a rear wheel final reduction gear unit 7 through a rear drive shaft 4, a propeller shaft 5 and a drive pinion 6 and driving force on the front wheel side inputs to a front wheel final reduction gear unit 11 through a transfer gear 8, transfer driven gear 9, front drive shaft 10. The automatic transmission 2, center differential 3 and front wheel final reduction gear unit 11 are integrally accommodated in a case 12.

Driving force inputted to the rear wheel final reduction gear unit 7 is transmitted partly to a left rear wheel 14RL via a left rear wheel drive shaft 13RL and on the other hand transmitted partly to a right rear wheel 14RR via a right rear wheel drive shaft 13RR. Further, driving force inputted to the front wheel final reduction gear unit 11 is transmitted partly to a left front wheel 14FL via a left front wheel drive shaft 13FL and transmitted partly to a right front wheel 14FR via a right front wheel drive shaft 13FR.

In the center differential 3, a first sun gear 15 having a large diameter is mounted on the transmission output shaft 2a. The first sun gear 15 meshes with a first pinion 16 having a small diameter, thus a first gear train being constituted.

Further, a second sun gear 17 having a small diameter is mounted on the rear drive shaft 4 for transmitting power to the rear wheels. The second sun gear 17 meshes with a second pinion 18 having a large diameter, thus a second gear train being constituted.

The first pinion 16 and second pinion 18 are integrally formed with a pinion member 19. A plurality of pinion members 19, for example three pinion members, are rotatably supported by a fixed shaft provided on a carrier 20. Further, the carrier 20 is connected at the front end thereof with the transfer drive gear 8 to output power to the front wheels.

Further, the carrier 20 is rotatably inserted from the front side by the transmission output shaft 2a and rotatably inserted from the rear side by the rear drive shaft 4. The first sun gear 15 and second sun gear 17 are accommodated in the vicinity of the central carrier 20. The first pinion 16 meshes with the first sun gear 15 and the second pinion 18 meshes with the second sun gear 17, respectively.

Thus, a compound planetary gear is accomplished without using a ring gear. The compound planetary gear type center differential 3 is provided with a differential function by appropriately establishing the number of teeth of those sun gears 15, 17 and pinions 16, 18.

Further, a desirable torque distribution including an unequal torque distribution weighted on rear wheels can be obtained by appropriately establishing working pitch diameters of the first and second pinions 16, 18 and the first and second sun gears 15, 17.

The center differential 3 can leave a thrust load by applying helical gears to the first and second sun gears 15, 17 and the first and second pinions 16, 18 and giving a different helix angle to the first and second gear trains, respectively. On the other hand, the fixed shaft of the carrier 20 receives a resultant force of separating and tangential loads caused by the engagement of the pinions 16, 18. Accordingly, the friction torque generating at both ends of the pinion member 19 is affected by this thrust force and the resultant force of separating and tangential loads. Thus obtained friction torque between the pinion member 19 and carrier 20 works as a differential limiting torque proportional to the input torque. That is, the center differential 3 itself can have a differential limiting function.

There is provided a transfer clutch 21 for varying the distribution of driving force between front and rear wheels between two output members of the center differential 3, that is, the carrier 20 and the rear drive shaft 4. The front and rear wheels torque distribution ratio of the center differential 3 can be varied within a range of 50:50 to 35:65 for example by controlling the engagement force of the transfer clutch 21.

The transfer clutch 21 is connected with a center differential clutch actuating section 51 constituted by a hydraulic circuit including a plurality of solenoid valves and is released or engaged by hydraulic pressure generated in the center differential clutch actuating section 51. Further, control signals to drive the center differential clutch driving section 51, output signals to be outputted to respective solenoid valves, are outputted from a differential limiting control section 50 for the center differential 3. The differential limiting control section 50 will be described hereinafter.

On the other hand, the rear wheel final reduction gear unit 7 comprises a bevel gear type differential mechanism 22 and a rear differential clutch 23 including a hydraulic type multiple disc clutch for performing differential limiting motion between left and right wheels.

The rear differential clutch 23 is provided between a differential case 25 secured to a ring gear 24 and the right rear wheel drive shaft 13RR and is connected with a rear differential clutch driving section 61 which is constituted by a hydraulic circuit including solenoid valves therein. The rear differential clutch 23 is released or engaged by a hydraulic pressure generated in the rear differential clutch actuating section 61. Further, control signals to drive the rear differential clutch actuating section 61, output signals to outputted to respective solenoid valves, are outputted from a differential limiting control section 60 for the rear differential. The differential limiting control section 60 will be described hereinafter.

In the differential limiting control section 50, also in the differential limiting control section 60, a target yaw rate γt and a road friction coefficient estimating value μe are used. These target yaw rate γt and road friction coefficient estimating value μe are outputted from a target yaw rate establishing section 70 which will be described hereinafter.

Further, the differential limiting control sections 50, 60 and the target yaw rate establishing section 70 input necessary control parameters from respective sensors and an engine control section as will be described hereinafter.

Wheel speeds of respective wheels 14FL, 14FR, 14RL and 14RR are detected by wheel speed sensors 32FL, 32FR, 32RL and 32RR, respectively and an actually generating yaw rate γ is detected from a yaw rate sensor 33. These values are inputted to the differential limiting control sections 50, 60 and target yaw rate establishing section 70.

An accelerator pedal opening angle θac is detected by an accelerator pedal opening angle sensor 34 and is inputted to the differential limiting control section 50 for the center differential and the differential limiting control section 60 for the rear differential.

Further, a steering wheel angle θH, an actually generating lateral acceleration (actual lateral acceleration) Gy, a longitudinal acceleration Gx, a brake fluid pressure Pb, are detected by a steering wheel angle sensor 35, a lateral acceleration sensor 36, a longitudinal acceleration sensor 37, a brake fluid pressure sensor 38 and these values are inputted to the target yaw rate establishing section 70. Further, a total driving torque Td (=engine output torque·transmission gear ratio/tire radius) is inputted to the target yaw rate establishing section 70.

There is provided a warning lamp 39 lighting in red when a road friction coefficient μe is outputted from the target yaw rate establishing section 70 on an instrument panel of the vehicle. Specifically, in case where the road friction coefficient μe is smaller than 0.3, the warning lamp 39 lights in red. In place of the lamp, a picture for visually indicating a slippery road surface may light in red. In addition to lighting the lamp, a sound warning raising an alarm "you are on a slippery road" to a driver may be used.

Next, the target yaw rate establishing section 70 for outputting a target yaw rate γt and a road friction coefficient estimating value μe to the differential limiting control sections 50, 60 will be described.

The target yaw rate establishing section 70 comprises a vehicle speed calculating section 70a, vehicle mass estimating section 70b, front and rear wheel mass distribution ratio calculating section 70c, front and rear axle mass estimating section 70d, front and rear axle to gravity center distance estimating section 70e, front and rear wheel equivalent cornering power estimating section 70f, stability factor reference value calculating section 70g, front wheel steering angle calculating section 70h, target yaw rate correction factor mean value calculating section 70i, stability factor calculating section 70j, steady state yaw rate gain calculating section 70k, reference yaw rate steady state value calculating section 70l, yaw inertia radius calculating section 70m, road friction coefficient estimating section 70n, first order lag time constant calculating section 70o, reference yaw rate calculating section 70p, correction speed calculating section 70q, actual yaw rate follow-up first order lag cut-off frequency calculating section 70r, actual yaw rate follow-up first order lag time constant calculating section 70s, target yaw rate correction factor calculating section 70t, target yaw rate calculating section 70u, minimum yaw rate calculating section 70v, and target yaw rate limiting section 70w.

The vehicle speed calculating section 70a inputs wheel speeds of respective wheels 14FL, 14FR, 14RL, 14RR from respective wheel speed sensors 32FL, 32FR, 32RL, 32RR. A vehicle speed V is calculated by averaging these wheel speeds and is outputted to the steady state yaw rate gain calculating section 70k, first order lag time constant calculating section 70o, correction speed calculating section 70q and minimum yaw rate calculating section 70v.

The vehicle mass estimating section 70b inputs a total driving force Td from the engine control section 31, a longitudinal acceleration Gx from the longitudinal acceleration sensor 37, a brake fluid pressure Pb from the brake fluid pressure sensor 38, respectively and estimates a vehicle mass me according to the following formulas (1) or (2).

$$me=Kb \cdot Pb/Gxb \text{ (on deceleration)} \quad (1)$$

$$me=Kd \cdot Td/Gxd \text{ (on accleration)} \quad (2)$$

where Kb, Kd is a conversion factor; and Gxb, Gxd is a deceleration or acceleration when the vehicle is braked or driven. Thus estimated vehicle mass me is outputted to the front and rear mass distribution ratio calculating section 70c, front and rear axle mass estimating section 70d, front and rear axle to gravity center distance estimating section 70e, stability factor reference value calculating section 70g, yaw inertia radius calculating section 70m and first order lag time constant calculating section 70o.

Figure 3:
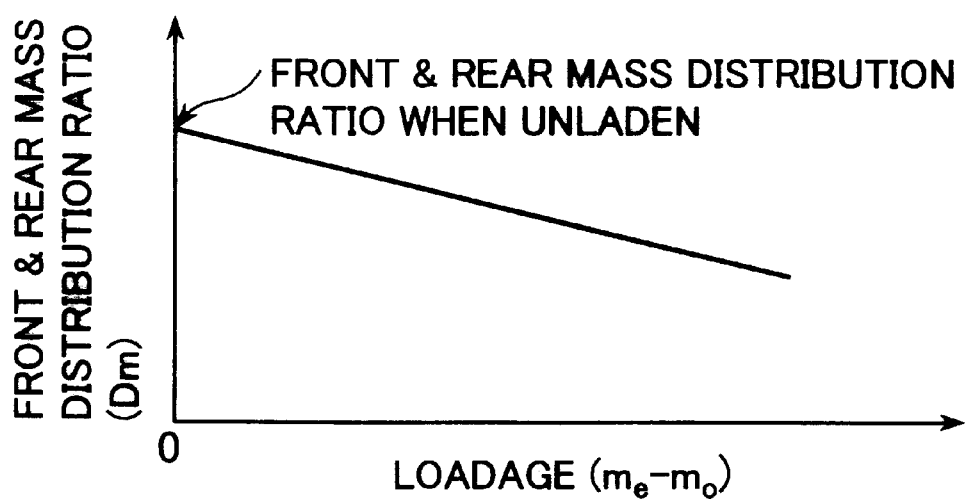
FIG. 3 is a diagram showing a characteristic of a front and rear mass distribution ratio versus to loadage.

The front and rear mass distribution ratio calculating section 70c inputs a vehicle mass me from the vehicle mass estimating section 70b and calculates a front and rear mass distribution ratio Dm by reference to such a table as shown in FIG. 3. The table of FIG. 3 indicates that the front and rear mass distribution ratio increases on the rear wheel side with an increase of loadage me−m0 (m0 is a vehicle mass when unladen) . Thus obtained front and rear mass distribution ratio Dm is inputted to the front and rear axle mass estimating section 70d.

The front and rear axle mass estimating section 70d inputs a vehicle mass me and a front and rear mass distribution ratio Dm from the vehicle mass estimating section 70b and the front and rear mass distribution ratio calculating section 70c, respectively. According to the following formulas (3) and (4), a front axle mass mfe and rear axle mass mre are calculated.

$$mfe=me \cdot Dm \quad (3)$$

$$mre=me \cdot (1-Dm) \quad (4)$$

Thus calculated front axle mass mfe and rear axle mass mre are outputted to the front and rear axle to gravity center distance estimating section 70e and front and rear wheel equivalent cornering power estimating section 70f.

The front and rear axle to gravity center distance estimating section 70e inputs a vehicle mass me and a front axle mass mfe and rear axle mass mre from the vehicle mass estimating section 70b and the front and rear axle mass estimating section 70d, respectively. Therein, a front axle to gravity center distance Lfe and rear axle to gravity center distance Lre are calculated according to the following formulas (5) and (6), respectively.

$$Lfe = L \cdot (mre/me) \tag{5}$$

$$Lre = L \cdot (mfe/me) \tag{6}$$

where L is wheel base. Thus estimated front axle to gravity center distance Lfe and rear axle to gravity center distance Lre are outputted to the stability factor reference value calculating section 70g and first order lag time constant calculating section 70o, respectively.

The front and rear wheel equivalent cornering power estimating section 70f inputs a front axle mass mfe and rear axle mass mre from the front and rear axle mass estimating section 70d and calculates a front wheel equivalent cornering power Kfe and rear wheel equivalent cornering power Kre in accordance with the following formulas (7) and (8).

$$Kfe = Kf0 \cdot (mfe/mf0) \tag{7}$$

$$Kre = Kr0 \cdot (mre/mr0) \tag{8}$$

where Kf0 is a front wheel equivalent cornering power when unladen; Kr0 is a rear wheel equivalent cornering power in an unladen condition; mf0 is a front axle mass in an unladen condition; and mr0 is a rear axle mass in an unladen condition. Thus calculated equivalent cornering powers Kfe, Kre are outputted to the stability factor reference value calculating section 70g and the first order lag time constant calculating section 70o, respectively.

The stability factor reference value calculating section 70g inputs a vehicle mass me, front axle to gravity center distance Lfe and rear axle to gravity center distance Lre, front wheel equivalent cornering power Kfe and rear wheel equivalent cornering power Kre from the vehicle mass estimating section 70b, front and rear axle to gravity center distance estimating section 70e and front and rear wheel equivalent cornering power estimating section 70f, respectively and calculates a stability factor reference value A0 according to the following formula (9).

$$A0 = -(me/(2 \cdot L^2)) \cdot ((Lfe \cdot Kfe - Lre \cdot Kre)/(Kfe \cdot Kre)) \tag{9}$$

The stability factor reference value A0 is outputted to the stability factor calculating section 70j.

The front wheel steering angle calculating section 70h inputs a steering wheel angle θH and an actual front wheel steering angle δf is calculated based on a steering gear ratio n corresponding to the steering wheel angle θH on a table according to the following formula (10):

$$\delta f = \theta H/n \tag{10}$$

The aforesaid table is designed so that the steering gear ratio n is decreased to enhance a steering responsibility when the vehicle travels nearly straight and is increased to reduce the steering effort when the vehicle turns corners. In case where the steering gear ratio is not variable, the front wheel steering angle δf is calculated directly from the formula (10) by letting n be constant. The calculated front wheel steering angle δf is outputted to the target yaw rate correction factor mean value calculating section 70i and the reference yaw rate steady state value calculating section 70l.

The target yaw rate correction factor mean value calculating section 70i inputs a front wheel steering angle δf and target yaw rate correction factor Cγm from the front wheel steering angle calculating section 70h and target yaw rate correction factor calculating section 70t, respectively and calculates a mean value CγmAL within a specified time of the target yaw rate correction factor Cγm when turning to left (left steering) and a mean value CγmAR within a specified time of the target yaw rate correction factor Cγm when turning to right (right steering). Then, these mean values CγmAL and CγmAR are outputted to the stability factor calculating section 70j.

The stability factor calculating section 70j inputs a stability factor reference value A0 from the stability factor reference value calculating section 70g, inputs the mean value CγmAL when turning to left and the mean value CγmAR when turning to right from the target yaw rate correction factor mean value calculating section 70i and calculates a stability factor AL when turning to left and a stability factor AR when turning to right according to the following formulas 811) and (12):

$$AL = A0 \cdot (C\gamma mA/(1 - C\gamma mAL)) \tag{11}$$

$$AR = A0 \cdot (C\gamma mA/(1 - C\gamma mAR)) \tag{12}$$

where CγmA is a mean value of CγmAL and CγmAR, that is, CγmA=(CγmAL+CγmAR)/2.

The stability factor AL, AR thus calculated are outputted as a stability factor A to the steady state yaw rate gain calculating section 70k.

The steady state yaw rate gain calculating section 70k inputs a vehicle speed V and a stability factor A from the vehicle speed calculating section 70a and stability factor calculating section 70j, respectively and calculates a steady state yaw rate gain Gγ according to the following formula (13):

$$G\gamma = (1/(1 + A \cdot V^2)) \cdot (V/L) \tag{13}$$

The calculated steady state yaw rate gain Gγ is outputted to the reference yaw rate steady state value calculating section 70l.

The reference yaw rate steady state value calculating section 70l inputs a front wheel steering angle δf and steady state yaw rate gain Gγ from the front wheel steering angle calculating section 70h and steady state yaw rate gain calculating section 70k, respectively and calculates a reference yaw rate steady state value γts according to the following formula (14):

$$\gamma ts = G\gamma \cdot \delta f = G\gamma \cdot (\theta H/n) \tag{14}$$

The calculated reference yaw rate steady state value γts is outputted to the reference yaw rate calculating section 70p.

The yaw inertia radius calculating section 70m inputs a vehicle mass me from the vehicle mass estimating section 70b and calculates a yaw inertia radius Rk according to the following formula (15). The yaw inertia radius Rk is outputted to the first order lag time constant calculating section 70o.

$$Rk = (Iz/me)^{1/2} \tag{15}$$

where Iz is a yaw inertia moment.

The road friction coefficient estimating section 70n inputs a target yaw rate correction factor Cγm from the target yaw rate correction factor calculating section 70t and calculates a road friction coefficient estimating value μe in accordance with the following formula (16) and outputs this value to the first order lag time constant calculating section 70o, warning device 39, differential limiting control section 50 of the center differential and differential limiting control section 60 of the rear differential.

$$\mu e = 1 - C\gamma m \tag{16}$$

Thus, when a road friction coefficient estimating value μe is outputted from the road friction coefficient estimating section 70n to the warning device 39, the warning device 39 lights in red when the road friction coefficient estimating value μe is smaller than 0.3 for example to inform a driver of a situation traveling on a slippery road.

The first order lag time constant calculating section 70o inputs a vehicle speed V from the vehicle speed calculating section 70a, a vehicle mass me from the vehicle mass estimating section 70b, a front axle to gravity center distance Lfe and rear axle to gravity center distance Lre from the front and rear axle to gravity center distance estimating section 70e, a front wheel equivalent cornering power Kfe and rear wheel equivalent cornering power Kre from the front and rear wheel equivalent cornering power estimating section 70f, a yaw inertia radius Rk from the yaw inertia radius calculating section 70m and a road friction coefficient estimating value μe from the road friction coefficient estimating section 70n and calculates a first order lag time constant Tr which is used when the yaw rate has a dynamic characteristic according to the following formula (17).

$$Tr(k)=((me \cdot V(k))/(2 \cdot (Kfe+Kre) \cdot \mu e(k-1))) \cdot (Rk^2/(Lfe \cdot Lre)) \quad (17)$$

where (k) means a present value and (k−1) means a previous value. The first order lag time constant Tr (k) is outputted to the reference yaw rate calculating section 70p.

The reference yaw rate calculating section 70p inputs a reference yaw rate steady state value γts from the reference yaw rate steady state calculating section 70l and a first order lag time constant Tr(k) from the first order lag time constant calculating section 70o and calculates a reference yaw rate γt0 according to the following formula (18) and outputs the reference yaw rate γt0 to the actual yaw rate follow-up-first order lag cut-off frequency calculating section 70r, target yaw rate correction factor calculating section 70t, target yaw rate calculating section 70u and target yaw rate limiting section 70w.

$$\gamma t0(k)=\gamma t0(k-1)+(\gamma ts(k)-\gamma t0(k-1)) \cdot (\Delta t/Tr(k)) \quad (18)$$

where Δt is calculation cycle time.

The reference yaw rate γt0(k) is a target yaw rate as a basis of correction. As clearly understood from the formula (18), it is a target yaw rate having a dynamic characteristic including first order lag.

The correction speed calculating section 70q inputs an actual yaw rate γ from the yaw rate sensor 33, an actual lateral acceleration Gy from the lateral acceleration sensor 36, and a vehicle speed V from the vehicle speed calculating section 70a and calculates a factor Cy for reducing a correction speed of the increasing target yaw rate according to the following formula (19) and (20) and outputs the factor Cy to the actual yaw rate follow-up first order lag cut-off frequency calculating section.

$$\text{in case of } Gy\gamma \geq 0 \, Cy=Gy\gamma-Gy' \text{ provided } Cy \geq 0 \quad (19)$$

$$\text{in case of } Gy\gamma<0 \, Cy=-(Gy\gamma-Gy') \text{ provided } Cy \geq 0 \quad (20)$$

where Gyγ is a lateral acceleration calculated from the actual yaw rate γ according to the formula Gyγ=γ·V and Gy' is a corrected value of an actual lateral acceleration Gy obtained from the lateral acceleration sensor 36. For example, the actual acceleration Gy is corrected by deleting a gravitational acceleration component caused by roll. Accordingly, Gy' is dependent upon the specification of the lateral acceleration sensor 36. Further, according to the formulas (19) or (20), the factor Cy for reducing the correction speed of the increasing target yaw rate is established so as to be larger, as the difference between the lateral acceleration Gyγ calculated from the actual yaw rate γ and the corrected lateral acceleration Gy' obtained from the lateral acceleration sensor 36 increases. As a result, the following-up of target yaw rate to actual yaw rate is delayed by the correction of the target yaw rate correction factor C γm when the vehicle has a spin tendency. The correction will be described hereinafter.

The actual yaw rate follow-up first order lag cut-off frequency calculating section 70r inputs the actual yaw rate γ from the yaw rate sensor 33, the reference yaw rate γt0 from the reference yaw rate calculating section 70p, the factor Cy from the correction speed calculating section 70q and the target yaw rate γt from the target yaw rate calculating section 70u and calculates a first order lag cut-off frequency Fm which follows the actual yaw rate γ according to formulas (21) and (22) expressed below:

$$\text{in case of } \gamma t \geq 0 \text{ and } \gamma \geq \gamma t \text{ or } \gamma t<0 \text{ and } \gamma \geq \gamma t, \, Fm=(2-Cy) \cdot \gamma t0 \text{ provided } Fm \geq 0 \quad (21)$$

$$\text{in case of others, } Fm=2 \cdot \gamma t0 \text{ provided } Fm \geq 0 \quad (22)$$

In case where the vehicle has a spin tendency, the actual yaw rate follow-up first order lag cut-off frequency calculating section 70r establishes the first order lag cut-off frequency Fm following the actual yaw rate γ so as to be small or so as to follow the actual yaw rate γ with a time lag and outputs the established first order cut-off frequency Fm to the actual yaw rate follow-up first order lag time constant calculating section 70s.

The actual yaw rate follow-up first order lag time constant calculating section 70s inputs the first order lag cut-off frequency Fm following the actual yaw rate γ from the actual yaw rate follow-up first order lag cut-off frequency calculating section 70r and calculates a first order lag time constant Tm following the actual yaw rate γ according to the following formula (23) and outputs the calculated Tm to the target yaw rate correction factor calculating section 70t.

$$Tm=1/(2\pi Fm) \quad (23)$$

The target yaw rate correction factor calculating section 70t inputs the actual yaw rate γ from the yaw rate sensor 33, the reference yaw rate γt0 from the reference yaw rate calculating section 70p, the first order lag time constant Tm following the actual yaw rate γ and the target yaw rate γt from the target yaw rate calculating section 70u and calculates a target yaw rate correction factor Cγm with first order lag with respect to the actual yaw rate γ according to the following formula (24).

$$C\gamma m(k)=C\gamma m(k-1)+(C\gamma mt(k)-C\gamma m(k-1)) \cdot (\Delta t/Tm)=C\gamma m(k-1)+((\gamma t(k-1)-\gamma(k))/\gamma t0(k) \cdot (\Delta t/Tm) \quad (24)$$

where Cγmt(k) is a target value of a target yaw rate correction factor. Thus calculated target yaw rate correction factor Cγm is outputted to the target yaw rate correction factor-mean value calculating section 70i, road friction coefficient estimating section 70n and target yaw rate calculating section 70u.

The target yaw rate calculating section 70u inputs the reference yaw rate γt0 from the reference yaw rate calculating section 70p, the target yaw rate correction factor Cγm from the target yaw rate correction factor calculating section 70t and calculates a target yaw rate γt according to the following formula (25):

$$\gamma t=\gamma t0-C\gamma m \cdot \gamma t0 \quad (25)$$

As clearly understood from the formula (25), Cγm·γt0 acts as a correction quantity with respect to the reference yaw rate γt0. Thus calculated target yaw rate γt is outputted to the actual yaw rate follow-up first order lag cut-off frequency calculating section 70r, target yaw rate correction factor calculating section 70t and target yaw rate limiting section 70w, respectively.

The minimum yaw rate calculating section 70v inputs the actual lateral acceleration Gy from the lateral acceleration sensor 36 and the vehicle speed V from the vehicle speed calculating section 70a and calculates a minimum yaw rate γ min according to the following formula (26):

$$\gamma min = Gy'/V \tag{26}$$

Further, a minimum yaw rate γmin' introducing an intrinsic error Δγ of the yaw rate sensor is calculated from the following formula (27) or (28):

$$\text{in case of } \gamma min \geq 0, \gamma min' = \gamma min - \Delta\gamma \tag{27}$$

$$\text{in case of } \gamma min < 0, \gamma min' = \gamma min + \Delta\gamma \tag{28}$$

Thus calculated γmin is outputted from the target yaw rate limiting section 70W.

The target yaw rate limiting section 70w inputs the yaw rate γ from the yaw rate sensor 33, the reference yaw rate γt0 from the reference yaw rate calculating section 70p, the target yaw rate γt from the target yaw rate calculating section 70u, and the corrected minimum yaw rate γmin' from the minimum yaw rate calculating section 70v. In case where the following limiting condition is satisfied, the target yaw rate γt is limited according to the following formula (29) and at the same time a target yaw rate correction factor Cγm is calculated according to the formula (30). The condition is: |γt|<|γmin'| and |γ|≧γe and |γmin'|≧γe where γe indicates a minimum yaw rate which can be judged to be correctable. That is, when it is judged that both actual yaw rate γ and corrected minimum yaw rate γ min' are in a correctable range, the target yaw rate γt is limited according to the following formulas (29), (30):

$$\gamma t = \gamma min' \tag{29}$$

$$C\gamma m = (\gamma t0 - \gamma min')/\gamma to \tag{30}$$

Thus limited γt is outputted to the target yaw rate calculating section 70u, center differential differential limiting control 50 and rear differential differential limiting control 60. In case where the limiting condition described above is not satisfied, the target yaw rate γt is directly outputted from the target yaw rate calculating section 70u to the center differential differential limiting control 50 and rear differential differential limiting control 60. The target yaw rate correction factor Cγm calculated according to the formula (30) is outputted to the target yaw rate correction factor calculating section 70t.

Figure 4:
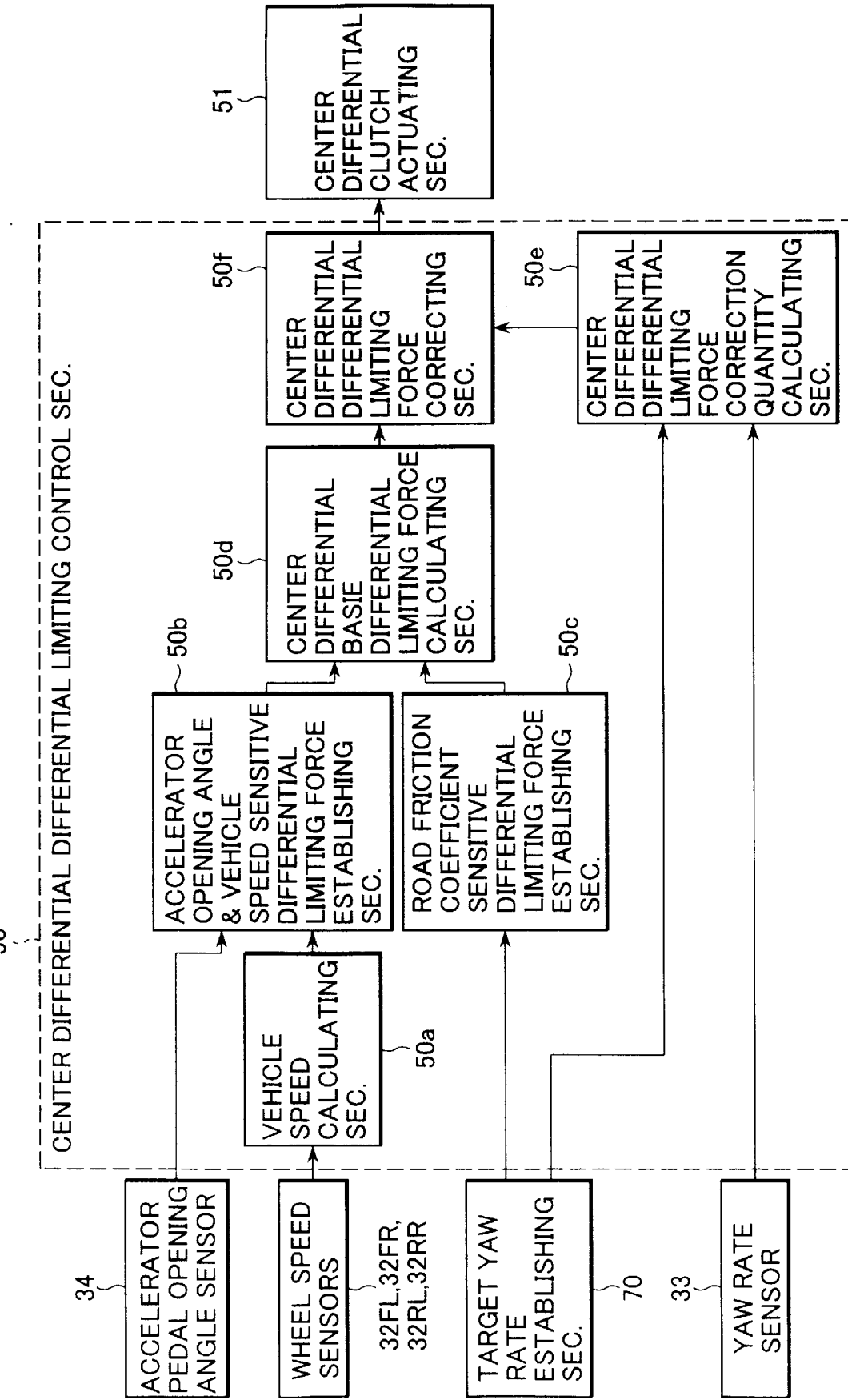
FIG. 4 is a functional block diagram of a differential limiting control section of a center differential.

The center differential differential limiting control section 50 will be described by reference to a functional block diagram of FIG. 4.

The center differential differential limiting control section 50 comprises a vehicle speed calculating section 50a, an accelerator pedal opening angle and vehicle speed sensitive differential limiting force establishing section 50b, a road friction coefficient sensitive differential limiting force establishing section 50c, a center differential base differential limiting force calculating section 50d, a center differential differential limiting force correction quantity calculating section 50e and a center differential differential limiting force correcting section 50f.

The vehicle speed calculating section 50a inputs wheel speeds of respective wheels 14FL, 14FR, 14RL and 14RR from wheel speed sensors 32FL, 32FR, 32RL and 32RR, as in the same manner as the vehicle speed calculating section 70a. These wheel speeds are averaged to calculate a vehicle speed V and the vehicle speed V is outputted to the accelerator valve opening angle and vehicle speed sensitive differential limiting force establishing section 50b.

The accelerator pedal opening angle and vehicle speed sensitive differential limiting force establishing section 50b inputs an accelerator pedal opening angle θac and the vehicle speed V from the vehicle speed calculating section 50a and establishes an accelerator pedal opening angle and vehicle speed sensitive differential limiting force TLSDCA by referring to predetermined look-up tables parameterizing the accelerator pedal opening angle θac and vehicle speed V and outputs to the center differential base differential limiting force calculating section 50d.

The look-up tables are established for each speed ratio, first gear to fourth gear and reverse. For example, as the accelerator pedal opening angle θac is small, and as the vehicle speed V is high, the accelerator pedal opening angle and vehicle speed sensitive differential limiting force TLSDCA is established to a smaller value to enhance turning ability and fuel economy.

The road friction coefficient sensitive differential limiting force establishing section 50c inputs the road friction coefficient estimating value μe from the target yaw rate establishing section 70 and establishes a road friction coefficient sensitive differential force TLSDCμ by reference to a predetermined look-up table parameterizing the road friction coefficient estimating value μe and outputs to the center differential base differential limiting force calculating section 50d.

Figure 5:
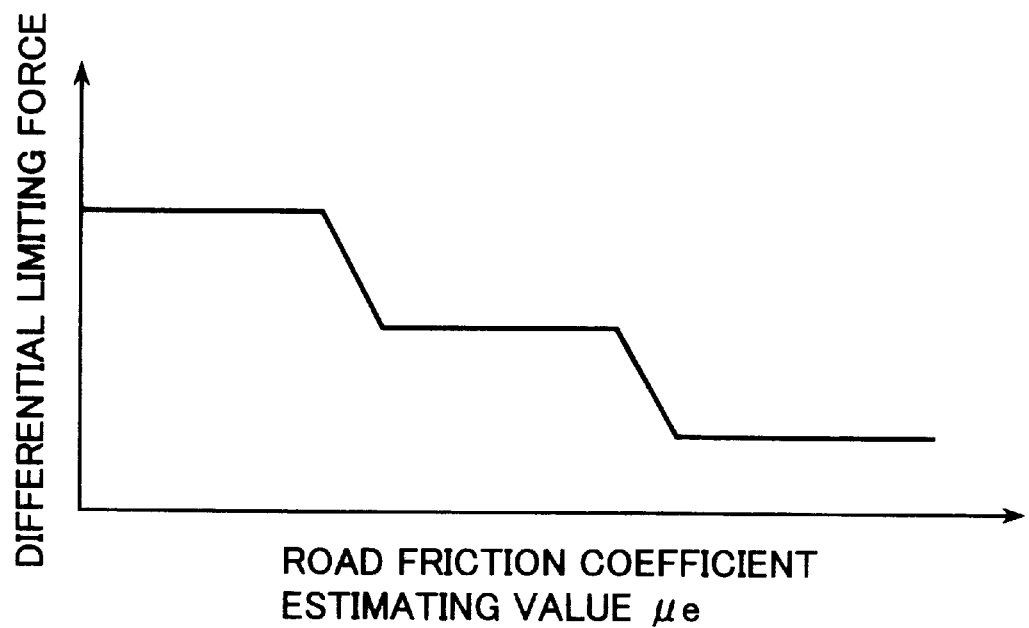
FIG. 5 is a diagram showing a characteristic of differential limiting force to be established versus to road friction coefficient estimation value.

This look-up table parameterizing the road friction coefficient estimating value μe has a characteristic as shown in FIG. 5. As the road friction coefficient μe becomes small, the roas friction coefficient sensitive differential limiting force TLSDCμ is established to be larger and the power distribution on a road surface with low friction coefficient is designed to come close to an equal front and rear distribution ratio of 50:50 to enhance vehicle stability.

The center differential base differential limiting force calculating section 50d inputs the accelerator pedal opening angle and vehicle speed sensitive differential limiting force TLSDCA from the accelerator pedal opening angle and vehicle speed sensitive differential limiting force establishing section 50b and the road friction coefficient sensitive differential limiting force TLSDCμ from the road friction coefficient sensitive differential limiting force establishing section 50c and makes an addition of these to produce a center differential base differential limiting force TLSDCm according to the following formula (31) and outputs to the center differential differential limiting force correcting section 50f.

$$TLSDCm = TLSDCA + TLSDC\mu \tag{31}$$

The center differential differential limiting force correction quantity calculating section 50e inputs the actual yaw rate γ and the target yaw rate γt from the target yaw rate establishing section 70 and calculates a center differential differential limiting force correction quantity TLSDCy according to the following formula (32) and outputs to the center differential differential limiting force correcting section 50f.

$$TLSDCy = |\gamma - \gamma t| \cdot Gyc \tag{32}$$

where Gyc is a correction gain. As understood from the formula (31), as the absolute value of the yaw rate deviation (γ−γt) of the vehicle becomes large and the vehicle has a strong tendency of spin, the center differential differential limiting force correction quantity TLSDCy is established to a larger value.

The center differential differential limiting force correcting section 50f inputs the center differntial base differntial limiting force TLSDCm from the center differential differential limiting force calculating section 50d and the center differntial differntial limiting force correction quantity TLSDCy from the center differntial differential limiting force correction quantity calculating section 50e and makes an addition of these according to the following formula (33) to produce a center differntial differntial limiting force TLSDC and outputs to the center differential clutch activating section 51.

$$TLSDC = TLSDCm + TLSDCy \quad (33)$$

Figure 6:
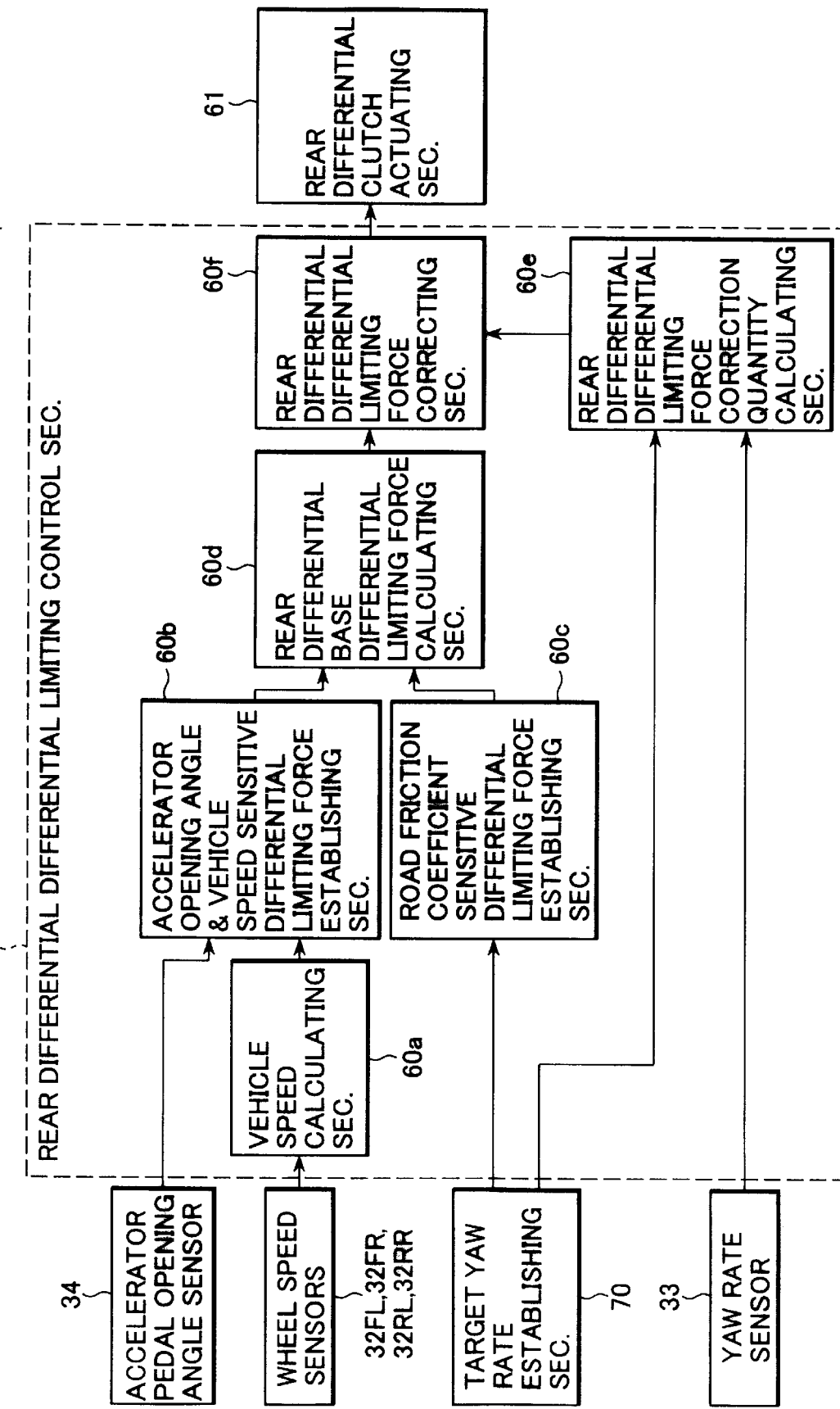
FIG. 6 is a functional block diagram of a differential limiting control section of a rear differential.

Next, the rear differential differential limiting control section 60 will be described by reference to FIG. 6.

The rear differential differential limiting control section 60 comprises a vehicle speed calculating section 60a, an accelerator pedal opening angle and vehicle speed sensitive differential limiting force establishing section 60b, a road friction coefficient sensitive differential limiting force establishing section 60c, a rear differential base differential limiting force calculating section 60d, a rear differential differential limiting force correction quantity calculating section 60e and a rear differential differential limiting force correcting section 60f.

The vehicle speed calculating section 60a inputs wheel speeds of respective wheels 14FL, 14FR, 14RL and 14RR from wheel speed sensors 32FL, 32FR, 32RL and 32RR in the same manner as the vehicle speed calculating section 70a. These wheel speeds are averaged to calculate a vehicle speed V and the vehicle speed V is outputted to the accelerator valve opening angle and vehicle speed sensitive differential limiting force establishing section 60b.

The accelerator pedal opening angle and vehicle speed sensitive differential limiting force establishing section 60b inputs an accelerator pedal opening angle θac and the vehicle speed V from the vehicle speed calculating section 60a and establishes an accelerator pedal opening angle and vehicle speed sensitive differential limiting force TLSDRA by referring to look-up tables predetermined parameterizing the accelerator pedal opening angle θac and vehicle speed V and outputs to the rear differential base differential limiting force calculating section 60d.

The look-up tables are established for each speed ratio, first gear to fourth gear and reverse. For example, as the accelerator pedal opening angle θac is small, and as the vehicle speed V is high, the accelerator pedal opening angle and vehicle speed sensitive differential limiting force TLSDRA is established to a smaller value.

The road friction coefficient sensitive differential limiting force establishing section 60c inputs the road friction coefficient estimating value μe from the target yaw rate establishing section 70 and establishes a road friction coefficient sensitive differential force TLSDRμ by reference to a predetermined look-up table parameterizing the road friction coefficient estimating value μe and outputs to the rear differential base differential limiting force calculating section 60d.

This look-up table parameterizing the road friction coefficient estimating value μe is designed such that as the road friction coefficient μe becomes small, the road friction coefficient sensitive differential limiting force TLSDRμ is established to a larger value to enhance vehicle stability.

The rear differential base differential limiting force calculating section 60d inputs the accelerator pedal opening angle and vehicle speed sensitive differential limiting force TLSDRA from the accelerator pedal opening angle and vehicle speed sensitive differential limiting force establishing section 60b and the road friction coefficient sensitive differential limiting force TLSDRμ from the road friction coefficient sensitive differential limiting force establishing section 60c and makes an addition of these to produce a rear differential base differential limiting force TLSDRm according to the following formula (34) and outputs to the rear differential differential limiting force correcting section 60f.

$$TLSDRm = TLSDRA + TLSDR\mu \quad (34)$$

The rear differential differential limiting force correction quantity calculating section 60e inputs the actual yaw rate γ from the yaw rate sensor 33 and the target yaw rate γt from the target yaw rate establishing section 70 and calculates a rear differential differential limiting force correction quantity TLSDRy according to the following formulas (35) or (36)) and outputs to the rear differential differential limiting force correcting section 60f.

in case of γt≧0 and γ≧γt or in case of γt<0 and γ≦γt $$TLSDRy = |\gamma - \gamma t| \cdot GyR \quad (35)$$

in case of others TLSDRy=0 \quad (36)

where GyR is a correction gain. As understood from the formulas (35),(36), as the absolute value of the yaw rate deviation (γ−γt) of the vehicle becomes large and the vehicle has a strong tendency of spin, the rear differential differential limiting force correction quantity TLSDRy is established to a larger value.

The rear differential differential limiting force correcting section 60f inputs the rear differntial base differntial limiting force TLSDRm from the rear differential differential limiting force calculating section 60d and the rear differntial differntial limiting force correction quantity TLSDRy from the rear differntial differential limiting force correction quantity calculating section 60e and makes an addition of these according to the following formula (37) to produce a rear differntial differntial limiting force TLSDR and outputs to the rear differential clutch activating section 61.

$$TLSDR = TLSDRm + TLSDRy \quad (37)$$

Figure 7:
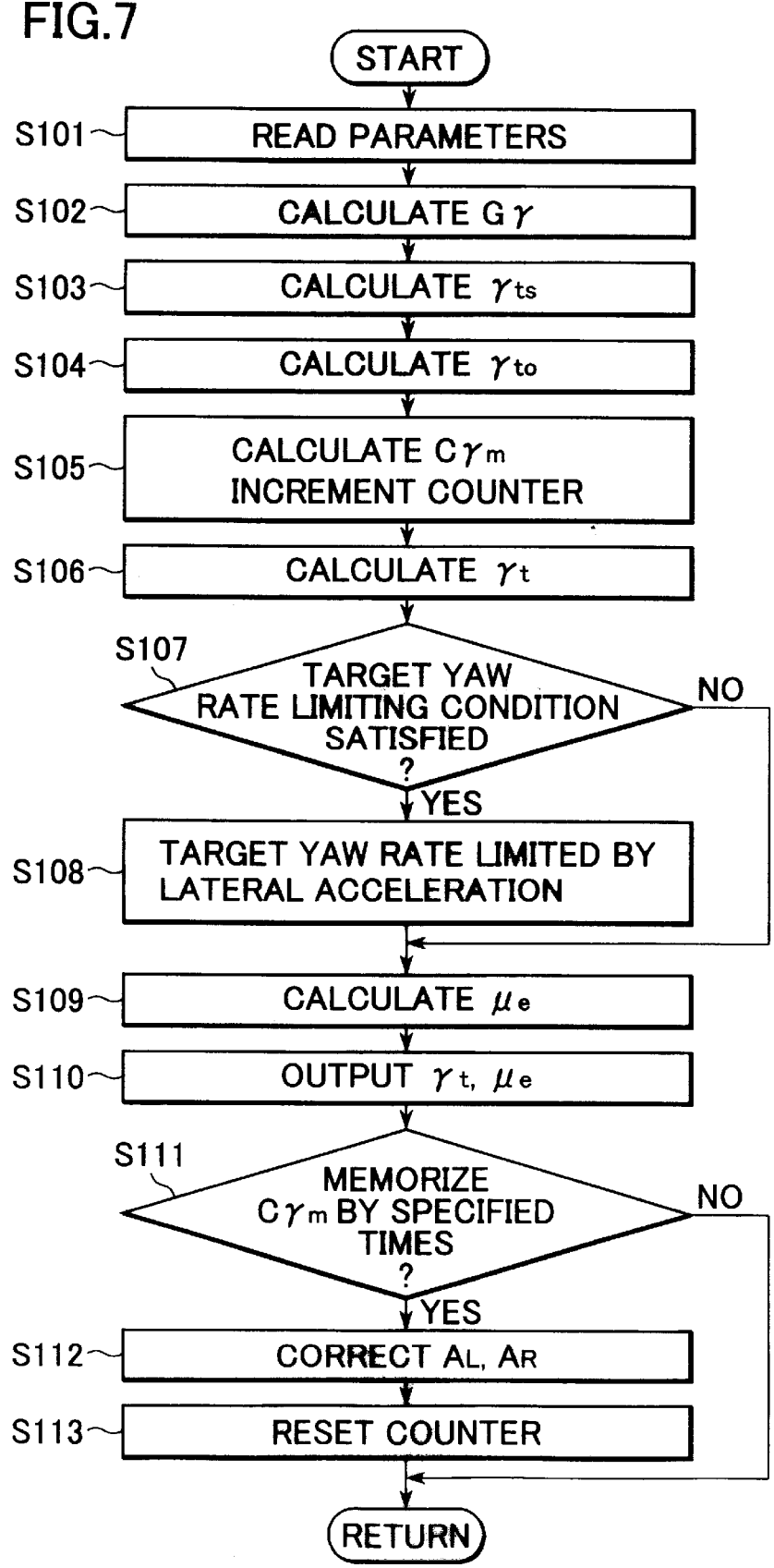
FIG. 7 is a flowchart for establishing a target yaw rate.

Next, the processing executed in the target yaw rate establishing section 70 will be described by reference to a flowchart of FIG. 7.

First, at a step (hereinafter, referred to as S) 101, parameters necessary for control are read and at S102 the steady state yaw rate gain Gγ is calculated according to the aforesaid formula (13).

Next, the program goes to S103 where the reference yaw rate γts is calculated according to the formula (14). The program goes to S104 in which the reference yaw rate γt0 is calculated according to the formula (18).

Next, the program goes to S105 where the target yaw rate correction factor Cγm is calculated according to the aforesaid formula (24). After this correction factor Cγm is memorized, the counter is incremented by one.

Then, the program goes to S106 where the target yaw rate γt is calculated according to the formula (25). At S107, it is judged whether or not the condition on which the target yaw rate γt is limited (limiting condition by γmin') is satisfied.

As a result of this judgment, if this limiting condition is satisfied, that is, if |γt|<|γmin'|and |γ|γe and |γmin'|≧γe, the program goes to S108 where the target yaw rate γt is limited by lateral acceleration and goes to S109. On the other hand, if the limiting condition is not satisfied, the program skips to S109.

At S109, the road friction coefficient estimating value μe is calculated by the aforesaid formula (16) and at S110 the target yaw rate γt is outputted to the center differential limiting control section 50 and rear differential limiting control section 60. Further, the road friction coefficient estimating value μe is outputted to the warning device 39, center differential limiting control section and rear differential limiting control section 60.

Then the program goes to S111 where it is judged whether or not the target yaw rate correction factor Cγm is memorized by a specified number of times. If it is not memorized specified times, the program leaves the routine and if it is memorized specified times, the program goes to S112.

At S112, the stability factor when turning to left AL and stability factor when turning to right AR are corrected by the average value of the memorized target yaw rate correction factors Cγm, respectively and the program goes to S113 where the memory counter is reset, leaving the routine.

Thus, according to the first embodiment of the present invention, an accurate target yaw rate γt is calculated taking the vehicle mass me, front and rear mass distribution ratio Dm, front axle mass mfe, rear axle mass mre, front axle to gravity center distance Lfe, rear axle to gravity center distance Lre, front wheel cornering power Kfe, rear wheel cornering power Kre and actual front wheel steering angle δf into cosideration.

Further, a separate steady state yaw rate gain Gγ is established for the steering to left and the steering to right, respectively, the yaw rate gain Gγ can be adjusted by comparing the correction hysteresis of the target yaw rate on a steering to right with the one of the target yaw rate on a steering to left. As a result, an accurate target yaw rate γt can be calculated in consideration of different characteristics between when steering to right and when steering to left.

Further, when the reference yaw rate γt0 is calculated taking vehicle dynamic characteristics into consideration, an accurate reference yaw rate γt0 can be calculated by changing the lag time constant Tr of yaw rate response to steering based on the road friction coefficient estimating value μe.

Further, when it is judged that the vehicle is in a spin condition, the target yaw rate γt is prevented from excessively glowing large by reducing or prohibiting the correction velocity of correcting the reference yaw rate γt0 by the target yaw rate correction factor Cγm and as a result the target yaw rate γt can be optimized.

Further, when the vehicle is making a turn and when an adequate actual lateral acceleration Gy generates compared to the precision of the yaw rate sensor 33, a minimum value γmin' of the target yaw rate is established on the basis of the actual lateral acceleration Gy. As a result, the target yaw rate γt is prevented from becoming excessively small.

Further, since the correction quantity of the target yaw rate γt is a ratio to the reference yaw rate γt0 and is memorized as the road friction coefficient estimating value μe, the change of yaw rate when a driver operates a steering wheel is separated from the change of yaw rate when the condition of road surfaces changes. As a result, a stable estimation of road surface conditions and a sensitive disturbance detection can be obtained.

The target yaw rate γt with high precision enables an accurate power distribution between front and rear wheels. Similarly, the target yaw rate γt with high precision enables an accurate power distribution between left and right wheels.

Next, a second embodiment of the present invention will be described by referring to FIG. 8 to FIG. 10. In the second embodiment, the center differential is modified and other components are the same as the first embodiment.

Figure 8:
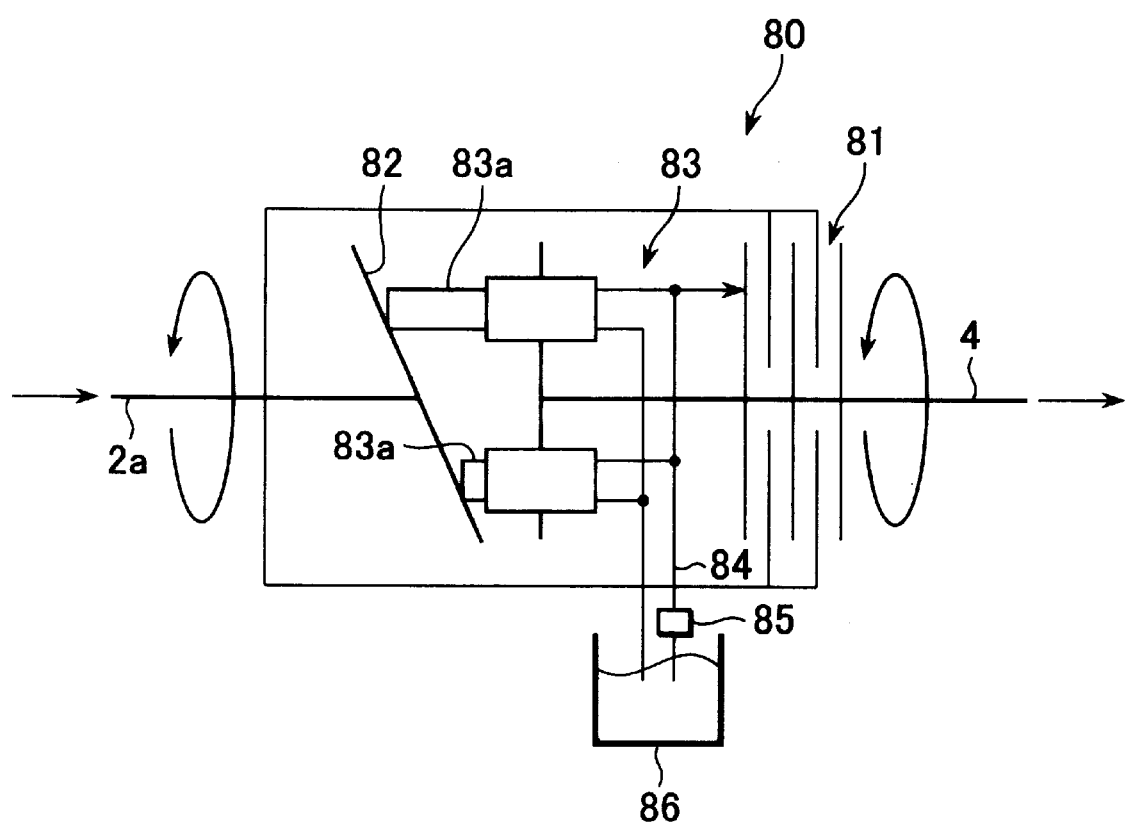
FIG. 8 is a schematic diagram showing a front and rear driving force distribution section according to a second embodiment of the present invention.

Referring now to FIG. 8, there is provided a front and rear driving force distributing section 80 between the output shaft 2a of the transmission and the rear drive shaft 4. The front and rear driving force distributing section 80 can vary driving force distribution by changing the engagement force of a hydraulic multiple-disc clutch 81 according to the rotation difference between input and output shafts.

The front and rear driving force distributing section 80 includes a plunger pump 83 for generating hydraulic pressure by longitudinally reciprocating a plunger 83a by a swash plate 82 provided at the rear end of the transmission output shaft 2a. Hydraulic pressure generated by the plunger pump 83 is varied by a control valve of a torque distribution pump 85 provided on a hydraulic piping 84. Reference numeral 86 denotes a reservoir.

The torque distribution clutch actuating section 85 is connected with a front and rear driving force distribution control section 90 for varying the engagement force of the hydraulic multiple-disc clutch 81.

Figure 9:
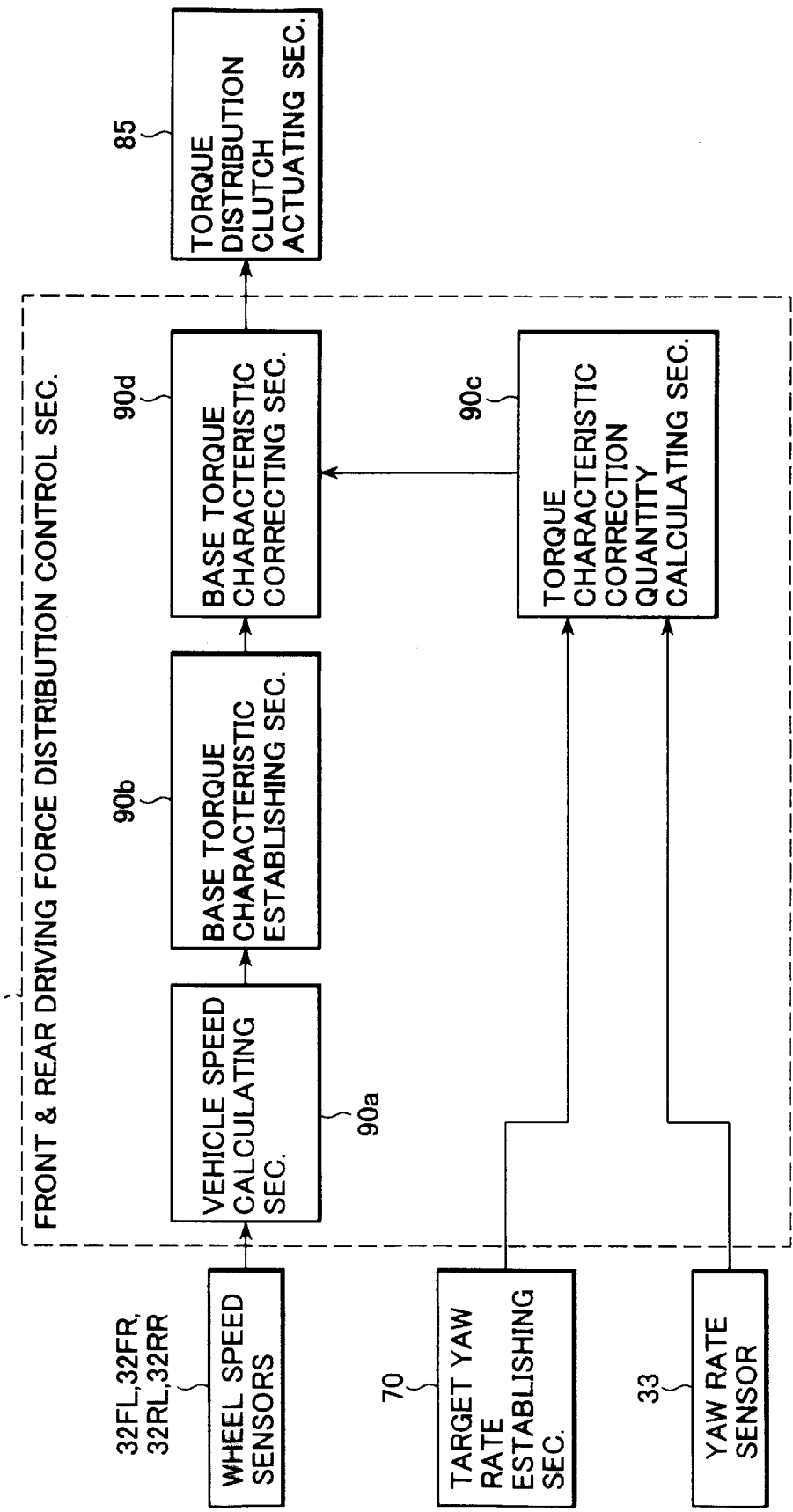
FIG. 9 is a functional block diagram of a front and rear driving force distribution section according to a second embodiment of the present invention.
Figure 10:
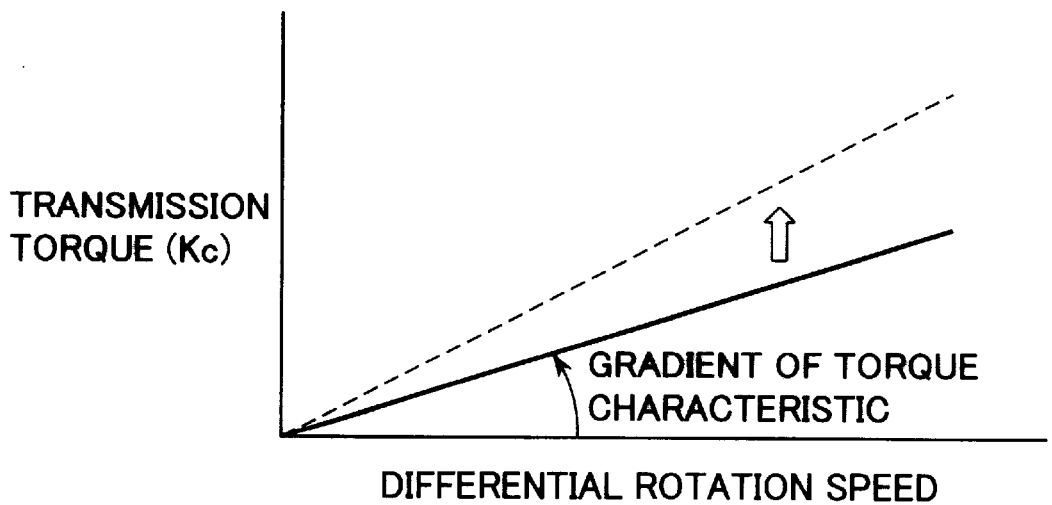
FIG. 10 is a graph showing a characteristic of transmission torque versus to differential rotation speed.

The front and rear driving force distribution control section 90, as shown in FIG. 9, comprises a vehicle speed calculating section 90a, a base torque characteristic establishing section 90b, a torque characteristic correction quantity calculating section 90c and a base torque characteristic correcting section 90d.

The vehicle speed calculating section 90a inputs wheel speeds of respective wheels 14FL, 14FR, 14RL and 14RR from wheel speed sensors 32FL, 32FR, 32RL and 32RR in the same manner as the vehicle speed calculating section 70a. These wheel speeds are averaged to calculate a vehicle speed V and the vehicle speed V is outputted to the base torque characteristic establishing section 90b.

The base torque characteristic establishing section 90b expresses the engaging force of the hydraulic multiple-disc clutch 81 as a base torque characteristic value Kcm which is established to a constant value or to an increasing function versus to the vehicle speed V and outputs to the base torque characteristic correcting section 90d.

The torque characteristic correction quantity calculating section 90c inputs the actual yaw rate γ from the yaw rate sensor 33 and the target yaw rate γt from the target yaw rate establishing section 70 and calculates a torque characteristic correction quantity Kcy according to the following formula (38) and outputs to the base torque characteristic correcting section 90d:

$$Kcy=|\gamma-\gamma t|\cdot Gyk \quad (38)$$

Where Gyk is a correction gain. As understood from the formula (38), as the absolute value of the yaw rate deviation (γ−γt) of the vehicle becomes large and the vehicle has a strong tendency of spin, the torque characteristic correction quantity Kcy is established to a larger value.

The base torque characteristic correcting section 90d inputs the base torque characteristic value Kcm and the torque characteristic correction quantity Kcy from the torque characteristic correction quantity calculating section 90c and makes an addition of these to calculate a transmission torque Kc generating when the hydraulic multiple-disc clutch 81 is engaged according to the following formula (39) and outputs to the torque distribution clutch actuating section 85.

$$Kc=Kcm+Kcy \quad (39)$$

Thus, the transmission torque Kc which is established by the base torque characteristic correcting section 90d and transmitted from the front side to the rear side is established to a larger value, as the number of differential rotation between the transmission output shaft 2a (front side) and the rear drive shaft 4 (rear side) becomes large. That is, as shown in FIG. 10, the gradient of the transmission torque is corrected so as to increase by the torque characteristic correction quantity Kcy. This means that as the vehicle has a strong tendency of spin, the transmission torque Kc is established to a larger value. As a result, the traveling stability of the vehicle enhances.

Thus, according to the second embodiment of the present invention, in a similar manner to the first embodiment, an accurate power distribution between front and rear axles can be obtained by using a target yaw rate γt with high precision.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A vehicle behavior control apparatus having target yaw rate establishing means for establishing a target yaw rate as a control target of said vehicle behavior control apparatus, said target yaw rate establishing means comprising:
   vehicle mass estimating means for estimating a vehicle mass based on a vehicle acceleration or deceleration;
   mass distribution calculating means for calculating a mass distribution between front and rear axles based on said vehicle mass;
   front and rear axles to gravity center distance calculating means for calculating distances between front and rear axles and a center of gravity;
   front wheel steering angle calculating means for calculating a steering angle of a front wheel based on a steering wheel rotation angle;
   first stability factor calculating means for calculating a stability factor on steering left based on at least one of said vehicle mass, said vehicle mass distribution, said distances between front and rear axles and center of gravity and said steering angle of said front wheel;
   second stability factor calculating means for calculating a stability factor on steering right based on at least one of said vehicle mass, said vehicle mass distribution, said distances between front and rear axles and center of gravity and said steering angle of said front wheel; and
   target yaw rate calculating means for calculating said target yaw rate based on said first stability factor when turning left and for calculating said target yaw rate based on said second stability factor when turning right.

2. The vehicle behavior control apparatus according to claim 1, wherein said front wheel steering angle calculating means includes a steering gear ratio varying means and said target yaw rate establishing means calculates said target yaw rate based on a steering gear ratio established by said steering gear ratio varying means.

3. The vehicle behavior control apparatus according to claim 1, wherein said target yaw rate establishing means includes road friction coefficient estimating means for estimating a road friction coefficient and calculating said target yaw rate by estimating a lag of target yaw rate with respect to steering at least according to said estimated road friction coefficient.

4. The vehicle behavior control apparatus according to claim 1, wherein said target yaw rate establishing means includes road friction coefficient estimating means for estimating a road friction coefficient and warning means for providing a warning based on said road friction coefficient and calculating said target yaw rate by estimating a lag of target yaw rate with respect to steering according to at least said estimated road friction coefficient.

5. The vehicle behavior control apparatus according to claim 1, wherein said target yaw rate establishing means has reference yaw rate calculating means for establishing said target yaw rate calculated by estimating a lag of yaw rate with respect to steering to a reference yaw rate and said reference yaw rate is corrected by multiplying said reference yaw rate by a target yaw rate correction factor to obtain a final target yaw rate.

6. A vehicle behavior control apparatus having target yaw rate establishing means for establishing a target yaw rate as a control target of said vehicle behavior control apparatus, said target yaw rate establishing means comprising:
   road friction coefficient estimating means for estimating a road friction coefficient and
   target yaw rate calculating means for calculating said target yaw rate by estimating a lag of said target yaw rate with respect to steering at least according to said estimated road friction coefficient,
   wherein said road friction coefficient estimating means estimates said road friction coefficient according to said target yaw rate correction factor.

7. A vehicle behavior control having target yaw rate establishing means for establishing a target yaw rate as a control target of said vehicle behavior control apparatus, said target yaw rate establishing means comprising:
   road friction coefficient estimating means for estimating a road friction coefficient;
   target yaw rate calculating means for calculating said target yaw rate by estimating a lag of said target yaw rate with respect to steering at least according to said estimated road friction coefficient; and
   warning means for providing a warning based on said estimated road friction coefficient,
   wherein said road friction coefficient estimating means estimates said road friction coefficient according to said target yaw rate correction factor.

8. The vehicle behavior control apparatus having target yaw rate establishing means for establishing a target yaw rate as a control target of said vehicle behavior control apparatus, said target yaw rate establishing means comprising:
   reference yaw rate calculating means for calculating a reference yaw rate which is a target yaw rate calculated by estimating a lag with respect to steering; and
   reference yaw rate correcting means for correcting said reference yaw rate by multiplying said reference yaw rate by a target yaw rate correction factor to obtain a final target yaw rate,
   wherein said final target yaw rate is outputted to a differential limiting control means for controlling a differentiation between one shaft and another shaft.

9. A method for establishing a target yaw rate as a control target of a vehicle behavior control apparatus comprising the steps of:
   calculating a first stability factor on steering left based on at least one of vehicle mass, vehicle mass distribution, distances between front and rear axles and center of gravity and steering angle of a front wheel;

calculating a second stability factor on steering right based on at least one of the vehicle mass, the vehicle mass distribution, the distances between front and rear axles and center of gravity and steering angle of the front wheel; and calculating a target yaw rate based on said first stability factor when turning left and calculating a target yaw rate based on said second stability factor when turning right.

10. The method for establishing the target yaw rate as claimed in claim 9, further including the steps of estimating a road friction coefficient and calculating said target yaw rate by estimating a lag of target yaw rate with respect to steering according to at least said estimated road friction coefficient.

11. The method for establishing the target yaw rate as claimed in claim 9, further including the steps of establishing said target yaw rate calculated by estimating a lag of yaw rate with respect to steering to a reference yaw rate, and correcting said reference yaw rate by multiplying said reference yaw rate by a target yaw rate correction factor to obtain a final target yaw rate.

12. A method for establishing the target yaw rate as a control target of a vehicle behavior control apparatus comprising the steps of:

varying a steering gear ratio according to a steering wheel rotation angle;

calculating a target yaw rate based on said steering gear ratio;

establishing said target yaw rate calculated by estimating a lag of yaw rate with respect to steering to a reference yaw rate; and correcting said reference yaw rate by multiplying said reference yaw rate by a target yaw rate correction factor to obtain a final target yaw rate.

13. A method for establishing a target yaw rate as a control target of a vehicle behavior control apparatus of a vehicle, said method comprising the steps of:

calculating a reference yaw rate;

calculating a target yaw rate correction factor based on the reference yaw rate, an actual yaw rate and a first order lag time constant;

calculating the target yaw rate based on the target yaw rate correction factor and the reference yaw rate;

calculating a road friction coefficient estimating value based on the target yaw rate correction factor; and outputting the target yaw rate to center and rear differential control sections of the vehicle.

14. A vehicle behavior control apparatus having target yaw rate establishing means for establishing a target yaw rate as a control target of said vehicle behavior control apparatus, said target yaw rate establishing means comprising:

reference yaw rate calculating means for calculating a reference yaw rate which is a target yaw rate calculated by estimating a lag with respect to steering; and reference yaw rate correcting means for correcting said reference yaw rate by multiplying said reference yaw rate by a target yaw rate correction factor to obtain a final target yaw rate, wherein said target yaw rate correction factor is calculated based on at least one of a target yaw rate correction factor previously calculated, a target yaw rate previously calculated, a reference yaw rate presently calculated and an actual yaw rate presently detected.

15. A vehicle behavior control apparatus having target yaw rate establishing means for calculating a target yaw rate as a control target of said vehicle behavior control apparatus, said target yaw rate establishing means comprising:

steering gear ratio varying means for varying a steering gear ratio according to a steering wheel rotation angle; and target yaw rate calculating means for calculating a target yaw rate based on said steering gear ratio, wherein said target yaw rate establishing means has reference yaw rate calculating means for establishing the target yaw rate calculated by estimating a lag of yaw rate with respect to steering to a reference yaw rate and said reference yaw rate is corrected by multiplying said reference yaw rate by a target yaw rate correction factor to obtain a final target yaw rate, and wherein said target yaw rate correction factor is calculated based on at least one of a target yaw rate correction factor previously calculated, a target yaw rate previously calculated, a reference yaw rate presently calculated and an actual yaw rate presently detected.

16. A vehicle behavior control apparatus having target yaw rate establishing means for establishing a target yaw rate as a control target of said vehicle behavior control apparatus, said target yaw rate establishing means comprising:

reference yaw rate calculating means for calculating a reference yaw rate which is a target yaw rate calculated by estimating a lag with respect to steering; and reference yaw rate correcting means for correcting said reference yaw rate by multiplying said reference yaw rate by a target yaw rate correction factor to obtain a final target yaw rate, wherein said target yaw rate correction factor corrects said reference yaw rate at a response speed substantially smaller than a changing speed caused by disturbance.

17. A vehicle behavior control apparatus having target yaw rate establishing means for calculating a target yaw rate as a control target of said vehicle behavior control apparatus, said target yaw rate establishing means comprising:

steering gear ratio varying means for varying a steering gear ratio according to a steering wheel rotation angle; and target yaw rate calculating means for calculating a target yaw rate based on said steering gear ratio, wherein said target yaw rate establishing means has reference yaw rate calculating means for establishing the target yaw rate calculated by estimating a lag of yaw rate with respect to steering to a reference yaw rate and said reference yaw rate is corrected by multiplying said reference yaw rate by a target yaw rate correction factor to obtain a final target yaw rate, and wherein said target yaw rate correction factor corrects said reference yaw rate at a response speed substantially smaller than a changing speed caused by disturbance.

18. A vehicle behavior control apparatus having target yaw rate establishing means for establishing a target yaw rate as a control target of said vehicle behavior control apparatus, said target yaw rate establishing means comprising:

reference yaw rate calculating means for calculating a reference yaw rate which is a target yaw rate calculated by estimating a lag with respect to steering; and reference yaw rate correcting means for correcting said reference yaw rate by multiplying said reference yaw rate by a target yaw rate correction factor to obtain a final target yaw rate, wherein said target yaw rate correction factor retards a correction speed of said reference yaw rate when an absolute value of said actually detected yaw rate is larger than that of said target yaw rate.

19. A vehicle behavior control apparatus having target yaw rate establishing means for calculating a target yaw rate as a control target of said vehicle behavior control apparatus, said target yaw rate establishing means comprising:

steering gear ratio varying means for varying a steering gear ratio according to a steering wheel rotation angle; and target yaw rate calculating means for calculating a target yaw rate based on said steering gear ratio, wherein said target yaw rate establishing means has reference yaw rate calculating means for establishing the target yaw rate calculated by estimating a lag of yaw rate with respect to steering to a reference yaw rate and said reference yaw rate is corrected by multiplying said reference yaw rate by a target yaw rate correction factor to obtain a final target yaw rate, and wherein said target yaw rate correction factor retards a correction speed of said reference yaw rate when an absolute value of said actually detected yaw rate is larger than that of said target yaw rate.

20. A vehicle behavior control apparatus having target yaw rate establishing means for establishing a target yaw rate as a control target of said vehicle behavior control apparatus, said target yaw rate establishing means comprising:

reference yaw rate calculating means for calculating a reference yaw rate which is a target yaw rate calculated by estimating a lag with respect to steering; and reference yaw rate correcting means for correcting said reference yaw rate by multiplying said reference yaw rate by a target yaw rate correction factor to obtain a final target yaw rate, wherein said target yaw rate correction factor varies a value to retard a correction speed of said reference yaw rate according to a lateral acceleration calculated from said actually detected yaw rate and an actually detected lateral acceleration.

21. A vehicle behavior control apparatus having target yaw rate establishing means for establishing a target yaw rate as a control target of said vehicle behavior control apparatus, said target yaw rate establishing means comprising:

reference yaw rate calculating means for calculating a reference yaw rate which is a target yaw rate calculated by estimating a lag with respect to steering; and reference yaw rate correcting means for correcting said reference yaw rate by multiplying said reference yaw rate by a target yaw rate correction factor to obtain a final target yaw rate, wherein said final target yaw rate is limited by a yaw rate calculated based on a lateral acceleration actually detected.

22. A vehicle behavior control apparatus having target yaw rate establishing means for calculating a target yaw rate as a control target of said vehicle behavior control apparatus, said target yaw rate establishing means comprising:

steering gear ratio varying means for varying a steering gear ratio according to a steering wheel rotation angle; and target yaw rate calculating means for calculating a target yaw rate based on said steering gear ratio;

wherein said target yaw rate establishing means has reference yaw rate calculating means for establishing the target yaw rate calculated by estimating a lag of yaw rate with respect to steering to a reference yaw rate and said reference yaw rate is corrected by multiplying said reference yaw rate by a target yaw rate correction factor to obtain a final target yaw rate, and wherein said target yaw rate correction factor varies a value to retard a correction speed of said reference yaw rate according to a lateral acceleration calculated from said actually detected yaw rate and an actually detected lateral acceleration.

23. The vehicle behavior control apparatus according to claim 1, wherein when said stability factor calculating means calculates said stability factor, said target yaw rate correction factor on steering left is used separately from said target yaw rate correction factor on steering right.

24. The vehicle behavior control apparatus according to claim 3, wherein said road friction coefficient estimating means estimates said road friction coefficient according to said target yaw rate correction factor.

25. The vehicle behavior control apparatus according to claim 4, wherein said road friction coefficient estimating means estimates said road friction coefficient according to said target yaw rate correction factor.

26. A vehicle behavior control apparatus having target yaw rate establishing means for calculating a target yaw rate as a control target of said vehicle behavior control apparatus, said target yaw rate establishing means comprising:

steering gear ratio varying means for varying a steering gear ratio according to a steering wheel rotation angle; and target yaw rate calculating means for calculating a target yaw rate based on said steering gear ratio, wherein said target yaw rate establishing means includes road friction coefficient estimating means for estimating a road friction coefficient and calculating said target yaw rate by estimating a lag of said yaw rate with respect to steering according to at least said estimated road friction coefficient, and wherein said road friction coefficient estimating means estimates said road friction coefficient according to a target yaw rate correction factor.

27. A vehicle behavior control apparatus having target yaw rate establishing means for calculating a target yaw rate as a control target of said vehicle behavior control apparatus, said target yaw rate establishing means comprising:

steering gear ratio varying means for varing a steering gear ratio according to a steering wheel rotation angle; and target yaw rate calculating means for calculating a target yaw rate based on said steering gear ratio, wherein said target yaw rate establishing means includes road friction coefficient estimating means for estimating a road friction coefficient and warning means for providing a warning based on said road friction coefficient and calculating said target yaw rate by estimating a lag of said target yaw rate with respect to steering according to at least said estimated road friction coefficient, and wherein said road friction coefficient estimating means estimates said road friction coefficient according to a target yaw rate correction factor.

28. The method for establishing the target yaw rate as claimed in claim 13, further including the step of correcting a stability factor when turning left and a stability factor when turning right based on an average target yaw rate correction factor.

* * * * *